(12) United States Patent
Zousman

(10) Patent No.: US 9,636,650 B2
(45) Date of Patent: May 2, 2017

(54) METHOD AND SYSTEM FOR CONTROLLED SYNTHESIS OF NANODIAMONDS

(75) Inventor: Boris Zousman, Givat Zeev (IL)

(73) Assignee: Ray Techniques Ltd., Givat Ram, Jerusalem (IL)

( * ) Notice: Subject to any disclaimer, the term of this patent is extended or adjusted under 35 U.S.C. 154(b) by 455 days.

(21) Appl. No.: 14/129,310

(22) PCT Filed: Jun. 26, 2012

(86) PCT No.: PCT/IL2012/000262
§ 371 (c)(1),
(2), (4) Date: Feb. 19, 2014

(87) PCT Pub. No.: WO2013/001527
PCT Pub. Date: Jan. 3, 2013

(65) Prior Publication Data
US 2014/0161710 A1    Jun. 12, 2014

Related U.S. Application Data

(60) Provisional application No. 61/501,229, filed on Jun. 26, 2011.

(51) Int. Cl.
| | |
|---|---|
| *B01J 3/06* | (2006.01) |
| *B01J 19/12* | (2006.01) |
| *C01B 31/06* | (2006.01) |
| *B01J 3/08* | (2006.01) |

(52) U.S. Cl.
CPC ............. *B01J 3/08* (2013.01); *B01J 19/121* (2013.01); *C01B 31/06* (2013.01); *B01J 2219/089* (2013.01)

(58) Field of Classification Search
None
See application file for complete search history.

(56) References Cited

U.S. PATENT DOCUMENTS

| | | | | |
|---|---|---|---|---|
| 5,066,515 A | * | 11/1991 | Ohsawa | ............... C01B 31/06 |
| | | | | 219/121.65 |
| 6,068,800 A | * | 5/2000 | Singh | .................. B01J 13/02 |
| | | | | 264/10 |
| 2010/0254884 A1 | * | 10/2010 | Shenderova | ............ C01B 31/06 |
| | | | | 423/446 |

FOREIGN PATENT DOCUMENTS

| | | |
|---|---|---|
| CN | 1347843 A | 5/2002 |
| JP | H04325407 A | 11/1992 |
| JP | 2008290119 A | 12/2008 |

(Continued)

OTHER PUBLICATIONS

Rosser et al.; Growth of Diamond Nanocrystals by Pulsed Laser Ablation of Graphite in Liquid; Diamond & Related Materials; 16, 725-729; 2007.*

(Continued)

*Primary Examiner* — Guinever S Gregorio
(74) *Attorney, Agent, or Firm* — Daniel J. Swirsky; AlphaPatent Associates Ltd.

(57) ABSTRACT

Method and system for controlled nanodiamond synthesis based on treating of a specially prepared solid carbon source target including carbon containing material in liquid media by irradiation energy beam focused at a predetermined distance from the target surface and having parameters to produce a light-hydraulic effect impacting the target surface and leading to the forming of diamond nanocrystals.

16 Claims, 3 Drawing Sheets

(56) References Cited

FOREIGN PATENT DOCUMENTS

| JP | 2011115750 A | 6/2011 |
|---|---|---|
| WO | 2007133765 A2 | 11/2007 |

OTHER PUBLICATIONS

Yang et al., Growth of diamond nanocrystals by pulsed laser ablation of graphite in liquid, Diamond and Related Materials, pp. 725-729, vol. 16, No. 4-7, Apr.-Jul. 2007, Elsevier Science Publishers, Amsterdam, NL. Available on-line Dec. 18, 2006.

Pearce et al., Production of nanocrystalline diamond by laser ablation at the solid/liquid interface, Diamond and Related Materials, Aug. 31, 2004, pp. 661-665, vol. 13, No. 4-8, Apr.-Aug. 2004, Elsevier Science Publishers, Amsterdam, NL.

Amans et al., Nanodiamond synthesis by pulsed laser ablation in liquids, Diamond and Related Materials, pp. 177-180, vol. 18, No. 2-3, Feb.-Mar. 2009, Elsevier Science Publishers, Amsterdam, NL. Available on-line Nov. 5, 2008.

Wang et al., Diamond nanospherulite: A novel material produced at carbon-water interface by pulsed-laser ablation, Science in China, Series B, Dec. 31, 1997, pp. 608-615, vol. 40, No. 6, Dec. 1997.

Petrov el al, Detonation nanodiamonds simultaneously purified and modified by gas treatment, Diamond and Related Materials, pp. 2098-2103, vol. 16, No. 12, Dec. 2007, Elsevier Science Publishers, Amsterdam, NL. Available on-line Jun. 14, 2007.

Yushin et al., Effect of sintering on structure of nanodiamond, Diamond and Related Materials, pp. 1721-1729, vol. 14, No. 10, Oct. 2005, Elsevier Science Publishers, Amsterdam, NL. Available on-line Aug. 10, 2005.

Hu et al., Synthesis and luminescence of nanodiamonds from carbon black, Materials Science and Engineering B, Feb. 15, 2009, pp. 11-14, vol. 157, No. 1-3, Elsevier Sequoia, Lausanne, CH.

Xu et al., Effect of heat treatment on the properties of nano-diamond under oxygen and argon ambient, Diamond and Related Materials, Feb. 28, 2002, pp. 249-256, vol. 11, No. 2, Feb. 2002, Elsevier Science Publishers, Amsterdam, NL.

Lequan et al., Micro-Raman, SEM, XPS, and electron field emission characterizations of nitrogen-induced shallow defects on nanodiamond films fabricated with different growth parameters, Diamond and Related Materials, pp. 191-195, vol. 18, No. 2-3, Feb.-Mar. 2009, Elsevier Science Publishers, Amsterdam, NL. Available on-line Dec. 31, 2008.

Gubarevich et al., Onion-like carbon deposition by plasma spraying of nanodiamonds, Carbon, Dec. 31, 2003, pp. 2601-2606, vol. 41, No. 13, 2003, Elsevier, Oxford, GB.

Barnard, A.S., Diamond standard in diagnostics: nanodiamond biolabels make their mark, The Analyst, pp. 1751-1764, vol. 134, No. 9, Sep. 2009. Available on-line Jul. 2, 2009.

\* cited by examiner

METHOD AND SYSTEM FOR CONTROLLED SYNTHESIS OF NANODIAMONDS

CROSS-REFERENCE TO RELATED APPLICATIONS

This application is a U.S. National Phase Application under 35 U.S.C. 371 of International Application No. PCT/IL2012/000262, which has an international filing date of Jun. 26, 2012, and which claims the benefit of priority from U.S. Provisional Patent Application No. 61/501,229, filed on Jun. 26, 2011, the disclosures of which are incorporated herein by reference in their entirety.

FIELD OF THE INVENTION

This invention generally in the field of an artificial diamonds, and relates to a method and system for synthesizing nanodiamonds.

BACKGROUND OF THE INVENTION

Currently diamonds are widely used in various industries such as aerospace, semiconductor, precision machinery, optical instrument, automotive, composite materials, etc.

A leading trend, influencing the entire industrial diamond field, is the growing use of the so-called nanodiamonds or Ultra Disperse Diamonds (UDD) or Ultra NanoCrystalline Diamonds (UNCD), which are the boundary state of a substance between individual molecules and a bulk state of a material. Nanodiamond powder is currently the most innovative synthetic diamond type which was discovered in Russia in the mid-60s and has been applied presently in various technologies due to its unique features enabling creation new composite materials and objects with desired properties.

Currently nanodiamond is widely used as the additive to polymer compounds, lubricants and coatings, as abrasive in fine polishing compositions, in catalysts and advanced composite materials, as well as in biological and nano-medical research for various applications.

The process of nanodiamond manufacturing usually includes two main stages: synthesis and purification.

Currently several techniques exist for nanodiamond synthesis. Nanodiamond is usually synthesized from carbon contained in molecules of explosives by the detonating (called nanodiamond of detonation origin). Nanodiamond could be also synthesized from a suspension of graphite in organic liquid at atmospheric pressure and room temperature using ultrasonic cavitations. The yield is approximately 10%. An alternative synthesis technique is irradiation of graphite by high-energy laser pulses. The structure and particle size of the obtained diamond is rather similar to that obtained in explosion.

Generally, the nanodiamond explosive synthesis is performed by the detonation of solid explosives in inert atmosphere from carbon source contained in explosive molecules (see, for example, V. Yu. Dolmatov, "Detonation synthesis of ultra-dispersed diamonds: properties and applications" Russian Chemical Reviews, 2001, V. 7(7), P, 607-626). In the front of detonation wave chemical bond splitting occurs causing instantaneous liberation of enormous amounts of energy. Under high temperatures (3000-4000 K.) and pressures (20-30 GPa) high-dispersed carbon medium is condensed from explosive carbon in a fraction of a microsecond. Conditions of detonation synthesis do not provide complete conversion of explosive carbon into a diamond phase. Carbon yield is 4-10% of an explosive weight, and significant purification and isolation steps are required.

The nanodiamond purification of UDD synthesized by detonation of solid explosives is a complex process that includes various mechanical and chemical treatments. In particular, the nanodiamonds purification usually starts from mechanical removal of various admixtures created during the process of preparation. Thereafter, in order to separate the diamond phase, the diamond—carbonic powder is subjected to thermal oxidation with compositions containing sulfuric and nitric acids. Then, after separation from acidic media, the nanodiamond grains are rinsed with water.

For example, PCT Application No. WO 03/086970 to Korjenevsky et al. describes a technique for the production and purification of ultra dispersed synthetic diamonds. The method involves the detonation-transformation of explosive material having a negative oxygen balance in the closed space of a blasting chamber in a nonoxidizing atmosphere, the evacuation of explosion products and the heat chemical purification thereof by a mineral acid followed by washing of impurities therefrom. The condensed detonation products are additionally exposed to the action of a shock wave. The chemical purification is carried out with a nitrogen acid aqueous solution in three stages: in the first stage, in periodic mode at a temperature ranging from 20 to 60° C.° during the time of 0.5 to 5 hours; in the second stage, in continuous mode and in five temperature zones at a temperature ranging from 110 to 300° C.° during the time of 20 to 120 minutes; and in the third stage, in periodic mode at a temperature ranging from 20 to 80° C.° during the time of 0.5 to 5 hours with the additional blowing of a reaction mass by an oxygen—containing gas mixture. The additional action of the shock wave on the condensed products is carried out repeatedly from 1 to 50 times at intervals ranging from 5 to 20 minutes, the pressure of a front shock being specified within the range of 0.4 to 15.0 MPA.

A method of production of ultra-dispersed diamond without providing an inert gas environment is described in U.S. Pat. No. 5,353,708 to Stavrev et al. The process comprises the steps of exploding, in a confined space, an organic explosive surrounded by water, wherein the organic explosive has a stoichiometrically negative oxygen balance, which explosion is initiated, in a normal environment or in a low-vacuum environment. The detonation process proceeds in an explosively unrelieved, confined space. The explosives are located in a solid shell, e.g. autoclave with radial axial control of the detonation process from the center of the charge to its periphery, and in a soft shell with radial-axial control from the periphery of the charge to its center. A typical charge is from about 400 grams to about 800 grams for a cylindrical space of about 1.2 meters diameter by 1.8 meters length The nanodiamonds produced by prior art detonation methods, depending on the conditions of the detonation synthesis, are characterized by a relatively broad variance of particle sizes typically ranging between 2 and 50 nm. The primary nanodiamond particles form fractal cluster structures (of 30-40 nm size) which consequently form larger aggregates (of an order of magnitude of hundreds of nanometers). In their usual state, the nanodiamonds produced by the prior art technique represent a powder that may have the purity of up to about 96-98% by weight of UDD particles, the volume of pores in the range of 0.3-1.1 $nm^3$/gram, the average diameter of the pores in the range of 8-10 nm.

A non-explosive method for synthesizing nanodiamond crystals continuously at normal temperature and normal pressure is described in Chinese Patent No. 1547843 to Wengong Zhang, et al. According to this method, the surface of solid carbon source present in a continuously flowing (and shifting) soaking liquid phase, is impacted with focused pulse laser beam under the protection of proper protective atmosphere. The thickness of the liquid thin layer overflowing the surface of solid carbon source was controlling to be in the range of 0.01 to 5.00 mm with a liquid flow rate between 0.002 and 0.500 ml/sec. As a result, nanodiamond particles are formed in the high temperature and high pressure micro-area created in the solid-liquid interface before flowing out of the processing area (reactor).

General Description

The present invention, according to its one broad aspect, provides a new approach for the producing nanodiamonds, based on the creating acoustic shock-waves by radiation beam focused in the transparent liquid at the some predetermined distance from the surface of the specially prepared solid target containing carbon non-diamond source. Treating the specially prepared target by the acoustic shock waves leads to the forming of diamond nanocrystals.

In some embodiments of the invention the process of nanodiamond synthesis could be controlled by varying at least one of the distance between the focusing plane and the surface of the solid carbon source target and/or energy flux and/or width and/or shape of the laser pulse and/or content of the specially prepared carbon source target. For example average primary particle size from 3.9 to 300 nm could be controlled by varying at least energy intensity of the radiation beam.

By using this method, nanodiamond having, improved properties (purity, uniformity, etc.) could be prepared.

According to another broad aspect of the present invention there is provided a method of synthesizing powder of nanodiamond comprising;
providing a carbon source target;
providing a layer of liquid on the surface of the carbon source target;
generating an irradiation energy beam;
focusing said irradiation energy beam or beams onto a selected area located within the liquid and at a predetermined distance above the surface of the carbon source target.

The certain hydrodynamic effect is created impacting surface of carbon source target and more specifically providing conditions (e.g. temperature, pressure, etc.) sufficient for forming diamond cubic crystal structure. Such so called "light-hydraulic effect" was discovered and disclosed in 1963 year as "Science Discovery" registered in the USSR under number No. 65 in the name of A. Prokhorov et al.

Providing liquid layer on the surface of carbon source target could be performed by immersing the target into the liquid.

The present invention, in yet further aspect, may provide further cleaning or purification of the synthesized nanodiamond material. Nanodiamonds could be isolation and cleaned by flotation method in de-ionized water with further optional washing and drying.

The carbon containing material of target could include at least one element selected from fullerene, amorphous carbon, graphite, solid hydrocarbons.

The liquid may comprise at least water, glycerin, acetone, benzene or another liquid hydrocarbon.

The irradiation energy beam(s) may be produced by a laser.

In some embodiments, the laser being operated at least one wavelength within the range of 532 to 1320 nm.

The irradiation energy beam may be produced by at least one laser pulse.

In some embodiments, the laser pulse is a rectangular pulse.

A laser pulse width may be in the range of 1 nanosecond to about 5000 nanoseconds and most preferably of 10 to about 20 nanoseconds.

Laser pulse intensity may be in the range of about $10^6$ to about $10^{13}$ W/cm$^2$ and preferably of about $10^{10}$ to about $10^{11}$ W/cm$^2$.

The predetermined distance above the surface of the carbon source target may be in the range of about 0.1 to about 20 mm and preferably may be about 2-3 mm.

According to another broad aspect of the invention, there is provided a system for nanodiamond synthesis comprising: a holding assembly for accommodating a carbon containing carbon source target immersed in a liquid, an irradiation energy assembly configured for producing an irradiation energy beam, directed towards the carbon source target and focused onto a selected area located within the liquid at a predetermined distance and above surface of said carbon source target.

Holding assembly could include a liquid containing vessel for accommodation of carbon source target immersed in liquid.

In some embodiments, the vessel may include a window transparent to the irradiation energy beam passing there through.

The irradiation energy source may include a laser operable to emit light at least one wavelength in the range from 532 to 1320 nm and preferably 1064 nm.

According to another broad aspect of the invention an ultra dispersed diamond composition of matter is provided characterized by at least one of the following parameters:
i) having a purity of more than 99%;
ii) having an average particle size between 3.9 to 300 nanometers.

Preferably, in accordance with the present invention the nanodiamond composition of matter has all the above characteristics, i.e. has a purity of more than 99% and a particle distribution between 2 and 30 nm.

Preferably, the purity is more than 99%, preferably above 99.6% and most preferably above 99.9%.

Nanodiamond particle size distribution may be between 2 and 20 nm, or between 2 and 12 nm, or between 2 and 8 nm and most preferably between 2 and 4 nm.

The term "nanodiamond composition of matter" means a final form (product) in which the nanodiamond is presented to the consumer; including not only nanodiamond particles, but also a small amount of impurities in the composition of matter (mixture) which are residuals of carbon source target material, or other, e.g. environment material used in the process.

In accordance with one aspect of the present invention the nanodiamond composition of matter could predominantly (more than 99.6%, and preferably 99.95%) be composed of nanodiamond particles themselves, The purity of the nanodiamond powder produced by the method and system of the present invention can be up to 99.96 wt. % that superior the competitive figure of about 98 wt. % of the prior art nanodiamond product. Likewise, the nanodiamond powder according to the present invention is characterized by a narrow size distribution of the nanodiamond particles, e.g. mainly about of 4-5 nm.

The nanodiamond product according to the present invention may be easily and efficiently manufactured without the need for expensive equipment, reaction mixtures or lengthy and complicated purification processes.

The nanodiamond product according to the present invention may have a low manufacturing cost.

Various preparations could be produced based on the nanodiamond of the present invention, such as polishing products, lubricants, coolants, pharmaceutical preparations; polymer composites, chemical caring preparation, electrostatic spraying preparation, additive in electrolytes, precursor preparation for the diamond growth by CVD method, catalyst preparation, etc.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
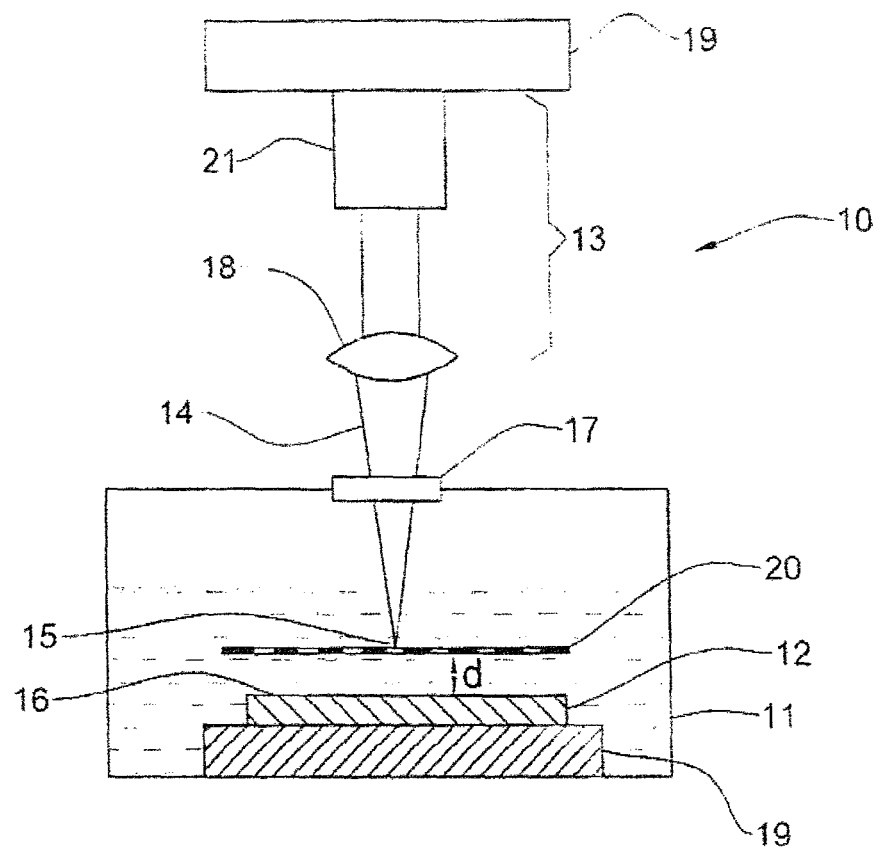
FIG. 1 is a simplified schematic view of an exemplary system 10 of the invention for nanodiamond synthesis, according to one embodiment of the invention.

Reference is made to FIG. 1, illustrating a simplified schematic view of an exemplary system 10 of the invention for nanodiamond synthesis, according to one embodiment of the invention. The system 10 includes a holding assembly, e.g. including a vessel 11 for accommodating a carbon containing carbon source target 12 immersed in liquid. The system also includes an irradiation energy assembly 13 configured for producing an irradiation energy beam 14, directed towards the carbon source target 12 and focusing the irradiation energy beam 14 onto a selected area 15. The selected area 15 is located within the liquid above a surface 16 of the carbon source target 12 on a predetermined distance d from the surface 16. As illustrated in FIG. 1, the vessel 11 could include a window 17 transparent to the irradiation energy beam 14 passing therethrough. The irradiation energy source 13 includes a beam forming optics, e.g. focusing unit 18 arranged for focusing the irradiation energy beam 14 onto the selected area 15. It should be noted that focusing unit could be designed for providing irradiating spot of desired shape, e.g. line-shaped, etc. When required, the system 10 may include at least one stage/conveyer 19 configured for providing a relative displacement of the selected area 15 along a plane 20 that can be visualized at the distance d above the surface 16. It should be understood that the providing of the relative displacement can be implemented by moving either the carbon source target 12 or the irradiation energy beam 14. Alternatively, the providing of the relative displacement can be implemented by moving both carbon source target 12 and the irradiation energy beam 14 in respect of each other.

It should be understood that the invention is not limited to the example of the system illustrated in FIG. 1. Hence, according to another example, the irradiation energy beam 14 can be arranged within the vessel 11 (not shown).

Examples of carbon containing materials of carbon source target 12 may include, at least one of: fullerenes $C_{60}$-$C_{100}$, amorphous carbon, graphite, solid hydrocarbons, e.g., styrene, naphthalene, etc. The liquid into which the carbon source target 12 is immersed can, for example, be either water or water with a carbon containing substance, e.g., glycerin, ethanol, acetone, fatty acids, etc, that are transparent to irradiation energy beam 14. Likewise, the water may contain dissolved gasses, such as noble gasses, $CO_2$, etc. One of the purposes of the adding of gases in the liquid is to enhance the generated compression shock waves.

Preferably, carbon containing materials of carbon source target 12 could be in the form of soot.

In that case carbon source target 12 could further include hydrocarbon and liquid. According to this example, the focusing unit 18 can include an arrangement of optical lens or lenses (only one such a lens is shown in FIG. 1) for providing radiation spot of desired shape and dimension.

An example of the irradiation energy source 13 includes, but is not limited to, a laser source 21 having such properties of the focused irradiation energy beam 14 so as to produce certain hydrodynamic effect impacting surface of carbon source target 12 and more specifically to provide conditions (e.g. temperature, pressure, etc.) sufficient for forming diamond cubic crystal structure. Such so called "light-hydraulic effect" was discovered and disclosed in 1963 year as "Science Discovery" registered in the USSR under number No. 65 in the name of A. Prokhorov et al.

The essence of the present invention can be better understood from the following non-limiting examples which are intended to illustrate the present invention and to teach a person of the art how to make and use the invention. This example is not intended to limit the scope of the invention or its protection in any way.

A layer of a mix of a commercially available fullerene $C_{60}$-$C_{100}$ with a binder having the thickness (width) in the range of 1-3 mm can be used as the carbon source target. Binder could include, low melting solid hydrocarbons, e.g. such as an organic wax. The layer can be placed on some substrate and immersed in deionized water.

The thickness of the deionized water layer above the surface of the carbon source target can, for example, be in the range of 0.5 to 10 mm.

In some embodiments carbon soot as carbon containing material for carbon source target could be used.

Commercially available laser source operating at the wavelength in the range of 532 to 1064 nm can be used for producing the nanodiamonds, according to the present invention. At least one single rectangular pulse of the electromagnetic energy having the pulse width in the range of about 0.01 to about 5 microseconds can be applied to the selected area located within the liquid phase above the surface of the carbon source target. Laser pulse intensity may be in the range of about $10^6$ to about $10^{13}$ W/cm$^2$ and preferably of about $10^{10}$ to about $10^{11}$ W/cm$^2$. The predetermined distance between the selected area and the surface of the carbon source target can be in the range of 0.5 to 10 mm, preferably in the range of 2-5 mm.

In one specific example, nanodiamonds with average size of nanodiamond particles between about 4 to about 5 nm have been obtained using laser pulses of 12 nanoseconds width with intensity of about $7\times10^{10}$ and focused onto a selected area located within the liquid at a distance of about 3 mm above the surface of the carbon source target immersed into deionized water. After the irradiation the produced material is subjected to a cleaning step of separation of the synthesized nanodiamond material from the non-converted material and the binder.

The present invention, in yet further aspect, may provide further cleaning or purification of the synthesized nanodiamond material. Nanodiamonds could be isolation and cleaned by flotation method in deionized water with further optional washing and drying.

The following properties of the nanodiamond can be obtained by the process and system of the present invention:

The purity of the nanodiamond powder is up to 99.99% by weight of nanodiamond particles as determined by conventional X-ray fluorescence (XRF) technique.

The size of the nanodiamond particles produced according to the present invention is of about 2-10 nm and is mainly distributed between 4 and 5 nm as determined by conventional tunneling electron microscopy (TEM), i.e. is very uniform.

In specific examples nanodiamond powder of the present invention could be characterized by at least one of the following: incombustible residue of 0.004%, Dseta (Zeta) potential: +45 (pH=7) and aggregate size in water: 5-50 nm.

Figure 2A:
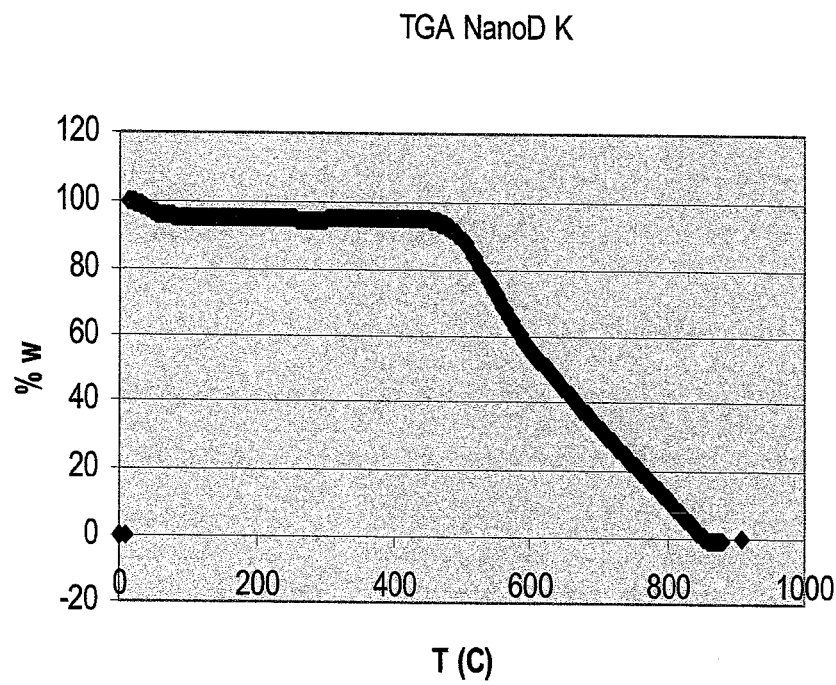
FIGS. 2A and 2B illustrate results of Thermo Gravimetric Analysis for nanodaimonds obtained by detonation or explosive based technique and present invention synthesis accordingly.
Figure 2B:
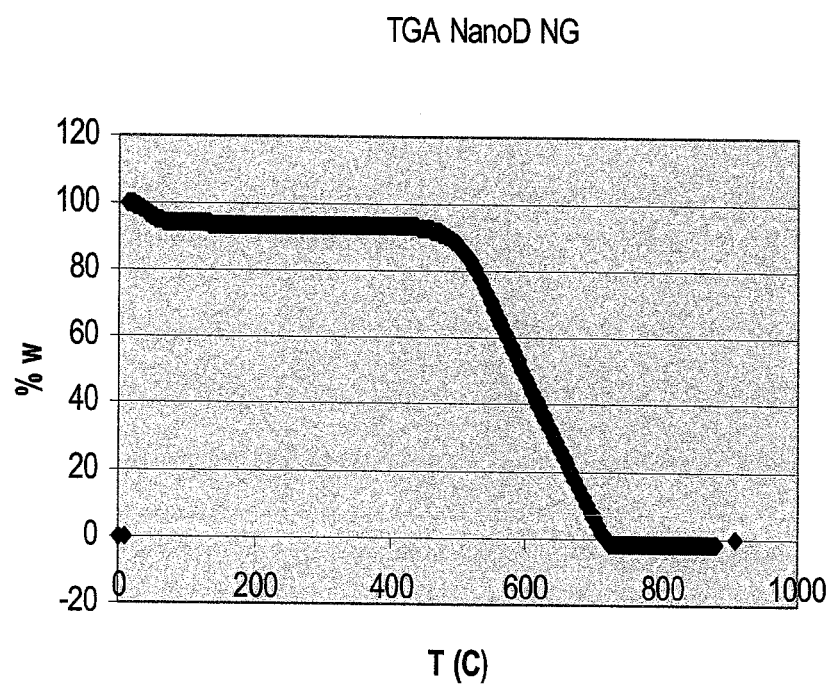

FIGS. 2A and 2B illustrate results of Thermo Gravimetric Analysis (TGA) for samples produced by detonation or explosive based technique and present invention technique accordingly. TGA graph for nanodiamond sample prepared in accordance with present invention (FIG. 2B) exhibits relatively narrow temperature range of decomposition: 250° C. in comparison with 390° C. for sample produced by detonation or explosive based technique. Presence of fracture at T=590° C. in FIG. 2A graph indicates heterogeneity of the material. This fracture is not presented in FIG. 2B graph characterizing sample prepared according to the present invention.

Figure 3A:
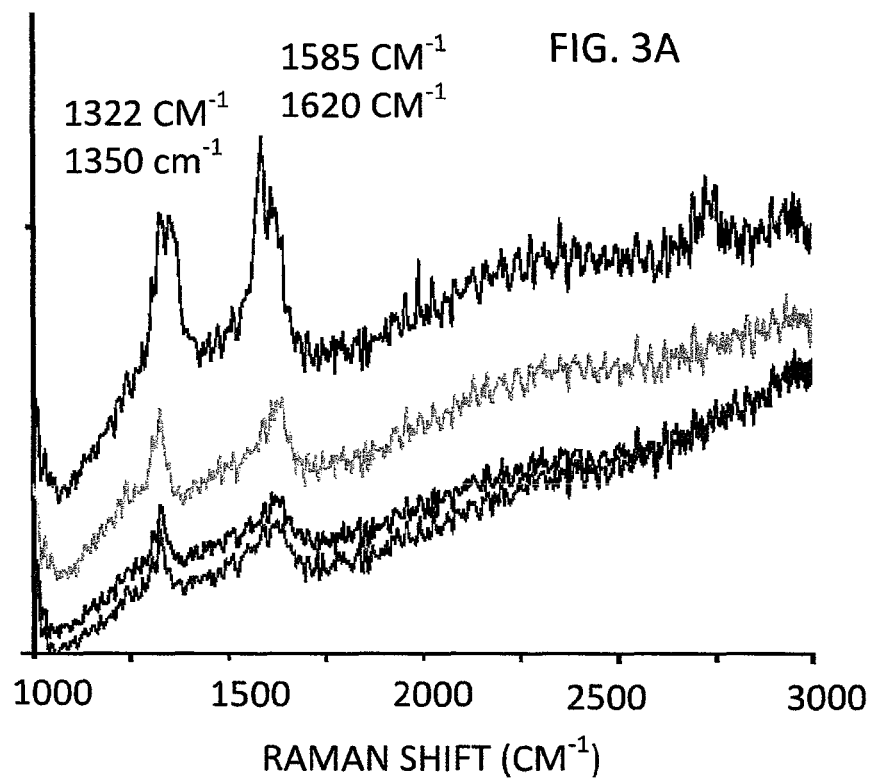
FIGS. 3A and 3B illustrate Raman spectra obtained for nanodiamonds produced by detonation and present invention synthesis accordingly.
Figure 3B:
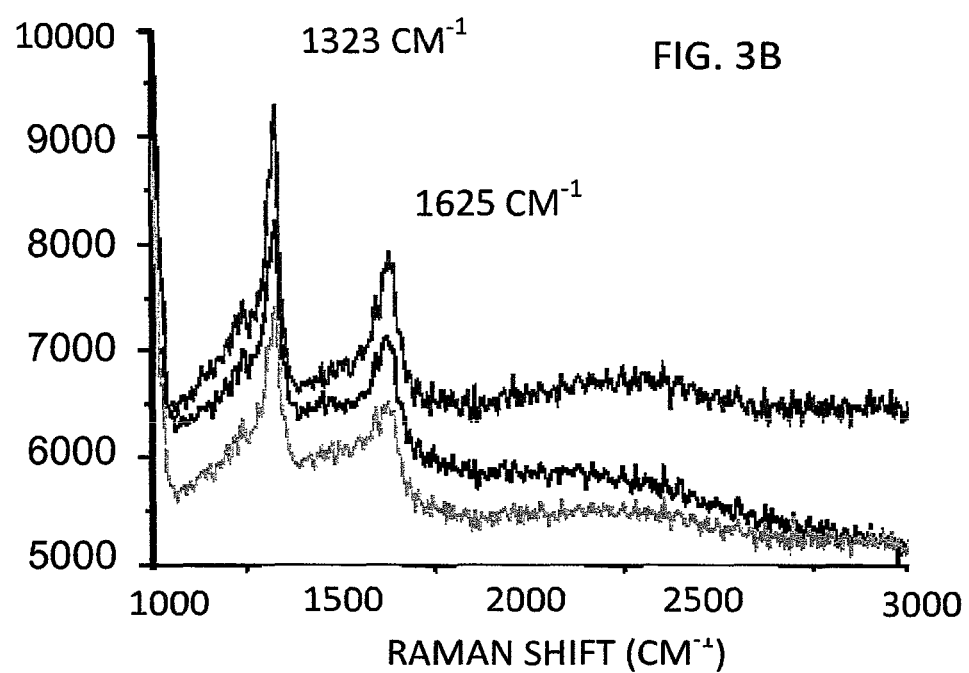

FIGS. 3A and 3B illustrates Raman spectra for nanodiamond samples produced by detonation or explosive based technique and present invention method accordingly. Intensive peak at 1323 $cm^{-1}$ of spectrum of FIG. 3B corresponds to higher diamond phase content in sample produced by present invention compared to detonation or explosive based technique (FIG. 2A). Shifts of peak corresponding to the diamond from 1332 $cm^{-1}$ to 1322 $cm^{-1}$ (FIG. 3A) and to 1323 $cm^{-1}$ (FIG. 3B), as well as the shifts of G-line from 1590 $cm^{-1}$ to 1620 $cm^{-1}$ and 1625 $cm^{-1}$ could confirm average nanodiamond size of about 2-6 nm. Additional peak at Raman spectra of FIG. 3A at 1350 $cm^{-1}$ indicates the presence of particles with sizes 30-50 nm and the peak at 1585 $cm^{-1}$ indicates the presence of graphite.

Potential fields of application of the nanodiamond of the present invention include, but are not limited to, machine building, shipbuilding, space&aircrait industry, abrasive and medical tools, electronics, semiconductors manufacturing, electrical engineering, medicine, precise tooling, chemistry, biology, etc. For example, the nanodiamond produced by the method and system of the present invention could be used as additives to polishing pastes and suspensions for preparing highly precise materials for radio engineering, electronics, optics, medicine and machine building. In such applications, the nanodiamonds facilitate to reduce roughness of the treated surfaces to a few nanometers, or less. Moreover, the nanodiamonds obtained by the method and system of the present invention may be used in technologies of polymerization from solutions and melts, chemical curing, electron-beam, gas-flame and electrostatic spraying. Likewise, the nanodiamonds obtained by the method and system of the present invention can be used in preparing lubrication substances and lubricant-coolant liquids, for example, as additives to motor and transmission oils.

Furthermore, the nanodiamond obtained by the method and system of the present invention can be used in the metal plating technologies, where the nanodiamonds can be used along with metals, such as Cr, Ni, Cu, Au, Ag, Zn, Sn, Al, NiB, etc, Although the example of utilization of the method and system of the present invention was shown for production of nanodiamond, the technique can also be used, mutatis mutandis, for producing cubic boron nitride (CBN). CBN is similar to diamond in its polycrystalline structure and is also bonded to a carbide base. CBN is of great interest for a multitude of applications. CBN could work effectively in cutting tools for most common work materials, with the exception of titanium, or titanium-alloyed materials, because of its extreme hardness and therefore brittleness. CBN combines a number of extreme properties, such as great hardness and rigidity, optical transparency over a large wavelength range, chemical resistance and high thermal conductivity.

It is to be understood that the terminology employed herein are for the purpose of description and should not be regarded as limiting.

Those skilled in the art will readily appreciate that various modifications and changes can be applied to the embodiments of the invention as hereinbefore described without departing from its scope defined in and by the appended claims.

The invention claimed is:

1. A method of controlled synthesis of nanodiamonds comprising steps of;
  providing a carbon source target including a binder mixed with non-diamond carbon particles containing material;
  providing a layer of liquid on the surface of said carbon source target; generating an irradiation energy beam; and
  focusing said irradiation energy beam above said carbon source target on a selected area located within the layer of the liquid at a predetermined distance from the surface of said carbon source target.

2. The method of claim 1 wherein said binder includes low melting solid hydrocarbons.

3. The method of claim 2 wherein said low melting solid hydrocarbons includes an organic wax.

4. The method of claim 1 wherein said liquid includes water.

5. The method of claim 4 wherein said water is deionized water.

6. The method of claim 1 wherein said layer of liquid on the surface of the carbon source target is provided by immersing the carbon source target into the liquid.

7. The method of claim 1 wherein said carbon particles containing material includes at least one of fullerene, amorphous carbon, graphite and solid hydrocarbons.

8. The method of claim 1 wherein said carbon particles containing material is in a form of soot.

9. The method of claim 1 wherein said irradiation energy beam is produced by at least one laser.

10. The method of claim 9 wherein said at least one laser being operated at least one wavelength within the range of about 532 to 1320 nm.

11. The method of claim 10 wherein said irradiation energy beam is produced by at least one laser pulse.

12. The method of claim 11 wherein said at least one laser pulse has a width in the range of about 0.001 to about 5 microseconds.

13. The method of claim 12 wherein said irradiation energy beam has intensity in the range of about 10 to about 10 W/cm.

14. The method of claim 1 wherein said predetermined distance from the surface of the carbon source target is in the range of about 0.1 to about 20 mm.

15. The method of claim 14 wherein said predetermined distance from the surface of the carbon source target is about 2-3 mm.

16. The method of claim 1 and further comprising steps of purification of the synthesized nanodiamonds by applying a flotation.

* * * * *